V. COLLIAU.
MACHINE FOR ROUNDING THE ENDS OF GEAR TEETH.
APPLICATION FILED APR. 7, 1919.
1,410,657.
Patented Mar. 28, 1922.
3 SHEETS—SHEET 1.
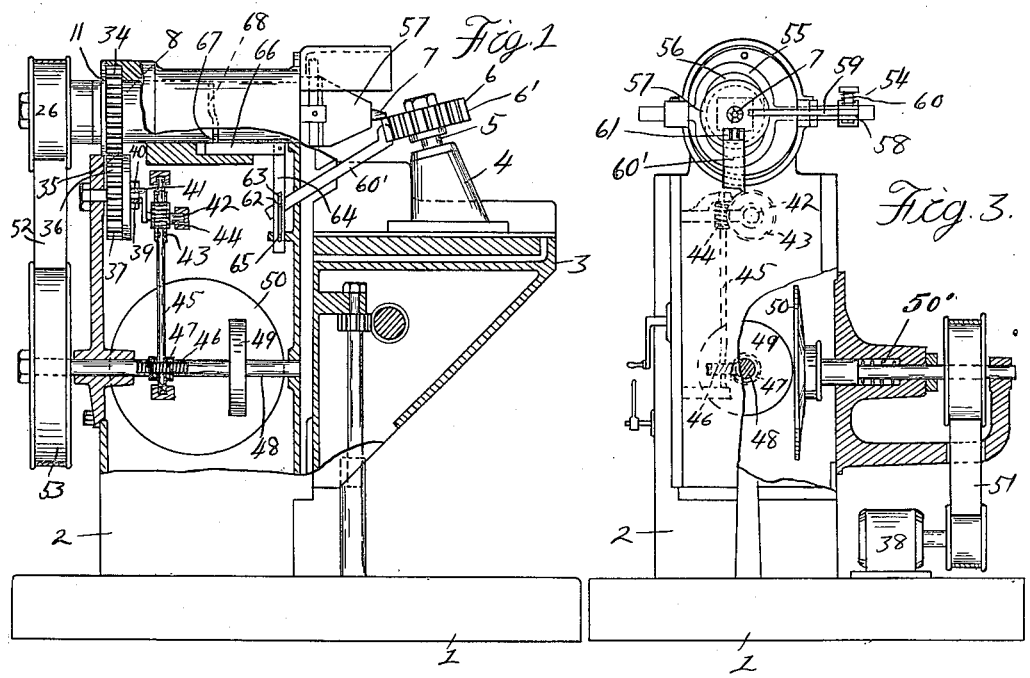
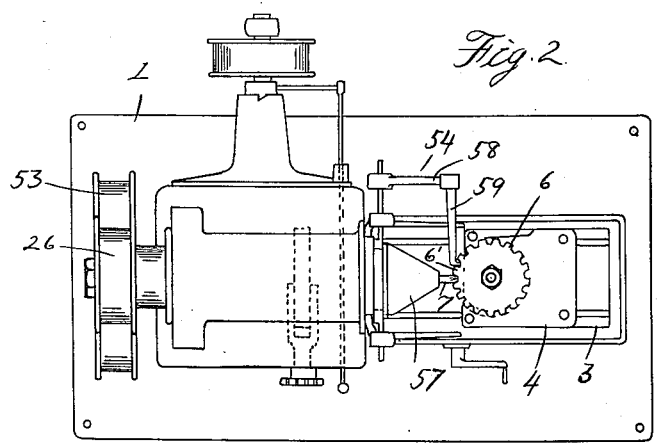
Inventor
Victor Colliau
By Whittemore Hulbert Whittemore
Attorneys

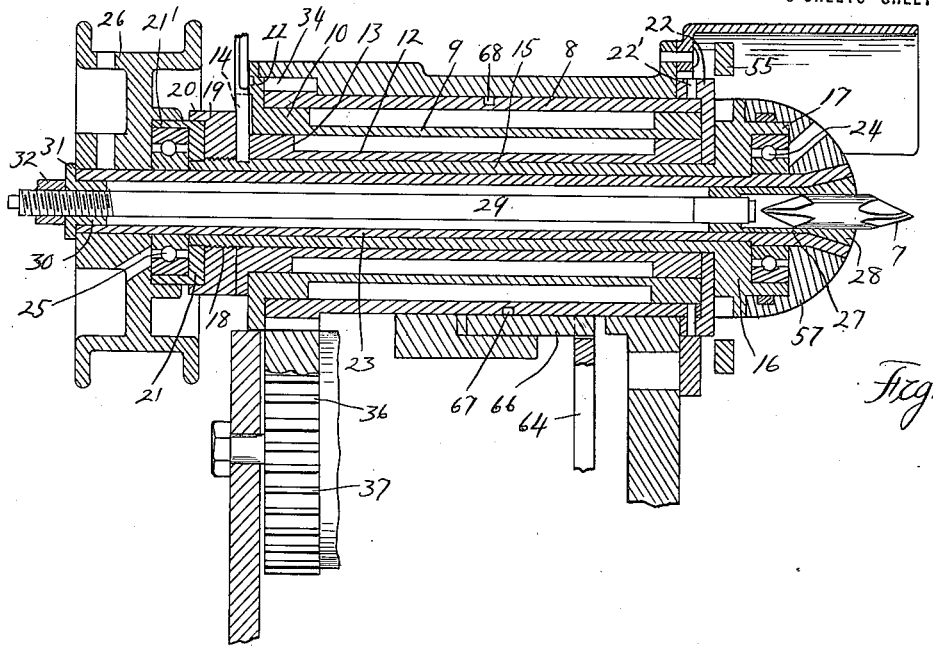
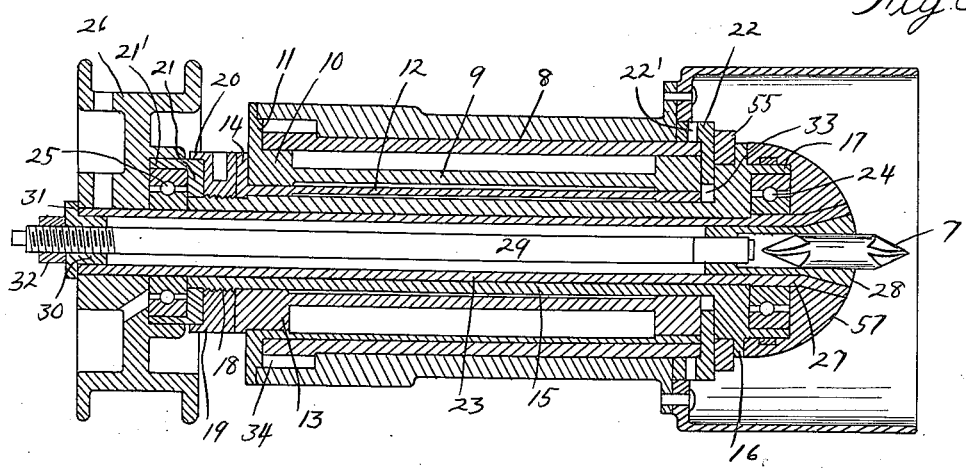

V. COLLIAU.
MACHINE FOR ROUNDING THE ENDS OF GEAR TEETH.
APPLICATION FILED APR. 7, 1919.
1,410,657.
Patented Mar. 28, 1922.
3 SHEETS—SHEET 3.
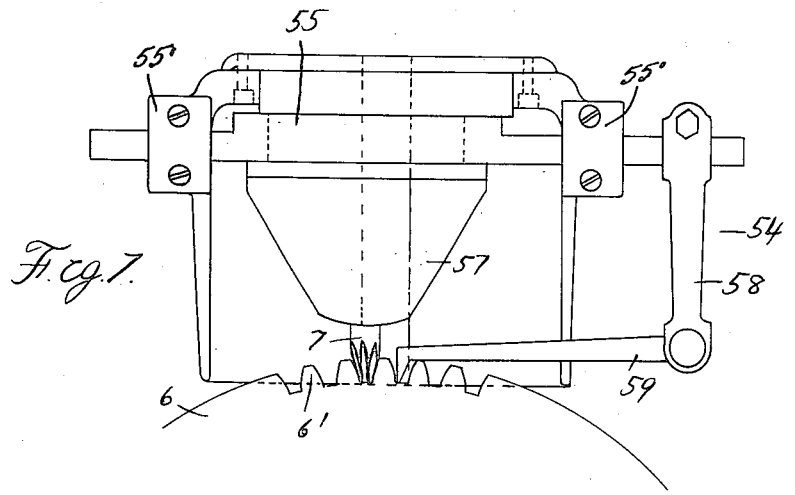
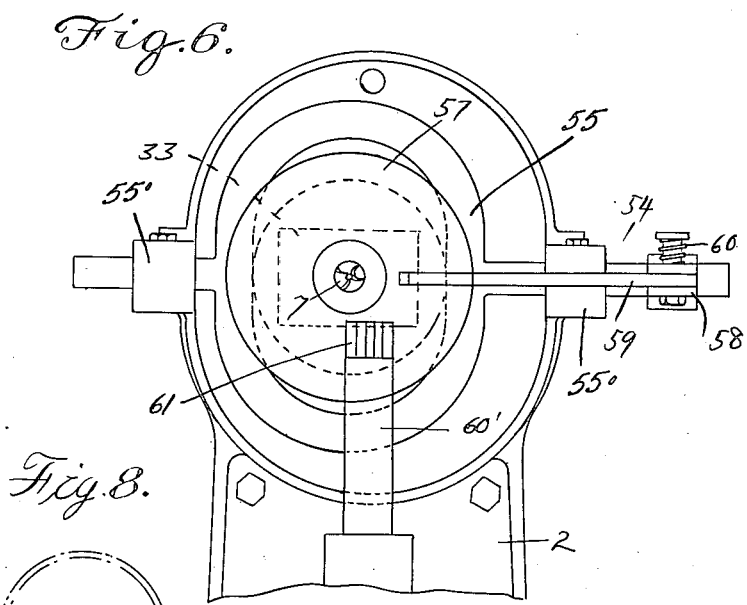
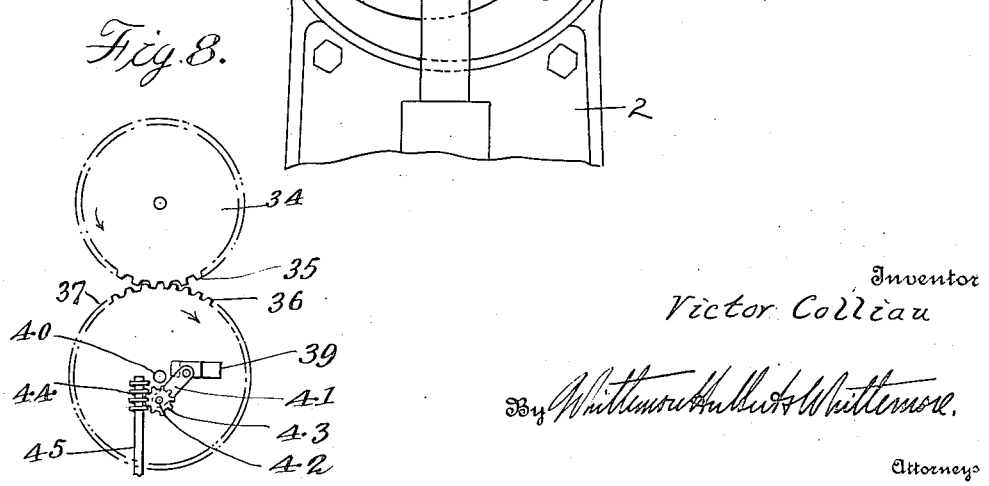
Inventor
Victor Colliau
By Whittemore Hulbert & Whittemore.
Attorneys

UNITED STATES PATENT OFFICE.

VICTOR COLLIAU, OF DETROIT, MICHIGAN.

MACHINE FOR ROUNDING THE ENDS OF GEAR TEETH.

1,410,657.  Specification of Letters Patent.  Patented Mar. 28, 1922.

Application filed April 7, 1919. Serial No. 288,158.

*To all whom it may concern:*

Be it known that I, VICTOR COLLIAU, a citizen of the United States of America, residing at Detroit, in the county of Wayne and State of Michigan, have invented certain new and useful Improvements in Machines for Rounding the Ends of Gear Teeth, of which the following is a specification, reference being had therein to the accompanying drawings.

The invention relates to machines for rounding the ends of gear teeth and has for one of its objects the provision of means for moving a revolving cutter, which is adapted to engage the ends of the teeth, through an arc from one side of a tooth to the other side, and indexing means operated by the cutter moving means for subsequently advancing the next tooth into operative relation with the cutter. Another object is the provision of automatically operated means for holding the gear stationary during the operation of rounding the ends of each tooth. A further object is the provision of a common means, for moving the cutter through a continuous orbit, for indexing the gear during a portion of the travel of the cutter to advance the next tooth into operative relation to the cutter and for retaining the gear stationary during another portion of the travel of the cutter. A still further object is the provision of means for slowly moving the cutter during its cutting operation and rapidly moving the cutter to its starting point after the cutting operation. Other objects of the invention reside in the novel arrangements and combinations of parts as more fully hereinafter set forth.

In the drawings:

Figure 1 is a side elevation, partly in section, of the machine embodying my invention;

Figure 2 is a top plan view thereof;

Figure 3 is a side elevation, partly in section, thereof;

Figure 4 is an enlarged vertical cross-section through the upper portion of the machine;

Figure 5 is an enlarged horizontal section therethrough;

Figure 6 is an enlarged end view of the upper portion of the machine with the gear removed;

Figure 7 is an enlarged top plan view of a portion of the machine with the guard removed;

Figure 8 is a rear elevation of the quick return mechanism.

1 is the base of the machine, 2 the upright hollow standard, and 3 the work-supporting table vertically slidably engaging the standard 2. 4 is a work head upon the table 3 and provided with the arbor 5 upon which the gear 6 is rotatably mounted. 7 is a revoluble cutter adapted to engage the ends of the gear teeth 6'. This cutter is movable through a circular orbit, the diameter of which is approximately equal to the sum of the thickness of the tooth and the diameter of the cutter.

For the purpose of moving the cutter through its circular orbit and at the same time for revolving the cutter, the following construction is provided: 8 is a cylindrical hollow main bearing rotatably mounted in the upper end of the standard 2. 9 is an outer eccentric sleeve having at its opposite ends the eccentrics 10 engaging the inner surface of the main bearing 8. The outer eccentric sleeve is further provided at its outer end with the transversely extending flange 11 which is adapted to engage the outer end of the main bearing 8 to rotatably engage a side of the standard 2. 12 is an inner eccentric sleeve having at its opposite ends the eccentric portions 13 engaging the inner surface of the outer eccentric sleeve 9. The inner eccentric sleeve is further provided at its outer end with the transversely extending flange 14, which is adapted to engage the outer surface of the flange 11 upon the outer eccentric sleeve. The arrangement of the eccentric portions 10 and 13 is such that upon turning one eccentric sleeve, it is necessary to turn the other to prevent binding. 15 is a hollow spindle bearing having the enlarged inner end portion 16 provided with an annular flange 17 concentric with the axis of the spindle bearing and having at its outer end the threaded portion 18 which is engaged by the nut 19. This nut is adapted to abut against the outer surface of the flange 14 upon the inner concentric member and has the outwardly-extending annular flange 20. 21 is a drum having a force fit upon the outer end of the spindle bearing 15 and having the outwardly-extending annular flange 21' concentric with the axis of the spindle bearing 15, this drum being of a diameter to fit within the flange 20 of the nut 19. 22 is an annular member surrounding the spindle bearing 15 near its inner end and having a body portion located between the inner ends of the eccentric sleeves and the enlarged inner end 16 of the spindle bearing. This member is suitably non-rotatably secured to the main bearing 8, as by pins 22' extending through the member 22 and into the main bearing. 23 is the hollow spindle extending through the spindle bearing 15 and antifrictionally mounted therein at the opposite ends of the spindle bearing, as by the anti-friction bearings 24 and 25, the bearings 24 extending between the annular flange 17 and the spindle, and the bearing 25 extending between the flange 21' upon the drum 21 and the spindle. 26 is a pulley non-rotatably secured upon the outer end of the spindle 23 for driving the same. The cutter 7 is non-rotatably mounted in the bushing 27 which has the flared end portion 28 adapted to engage a similarly flared portion at the inner end of the spindle 23. For securing this bushing 27 in the inner end of the spindle 23, the shaft 29 is provided secured to the inner end of the bushing 27 and extending through the spindle 23 to its outer end. The bushing 30 is sleeved upon the outer end of the shaft 29 and has the annular flange 31 extending over the spindle 23 and the hub of the pulley 26. The nut 32 threadedly engages the outer end of the shaft 29 and is clamped against the bushing 30.

For the purpose of varying the eccentricity of the cutter 7 relative to the axis of the main bearing 8 in order to cut gear teeth of different thicknesses, the member 22 is provided with the elongated aperture 33, which is slidably engaged by the spindle bearing 15. Thus, upon revolving the outer and inner eccentric sleeves in opposite directions the spindle bearing 15 is moved longitudinally in the elongated aperture 33, thereby correspondingly moving the cutter 7 through the spindle 23 and bushing 27 to vary the offset of the same relative to the axis of the main bearing. In order to rotate the eccentric sleeves 9 and 12, the nut 19 is rotated to release the pressure upon the flange 14 of the eccentric sleeve 12. These flanges are provided with suitable wrench-engaging apertures so that they may be readily revolved. Upon sufficient rotation of the eccentric sleeves, the nut 19 is clamped against the flange 14 to again secure the eccentric sleeves from rotation relative to the main bearing 8.

For the purpose of rotating the main bearing 8, the same is provided at its outer end with the gear 34 which rotatably engages in the end of the standard 2. The teeth 35 of this gear mesh with the teeth 36 upon the gear 37 which is driven from the motor 38 upon the base 1 by suitable intermediate mechanism. The gears 34 and 37 each have the same number of teeth. For the purpose of slowly moving the cutter through that part of the orbit during the cutting operation and more rapidly moving the cutter through the remaining part of the orbit during its return to the starting point the intermediate mechanism, shown particularly in Fig. 8, is as follows: 39 is a radial slot in the gear 37, which slot is slidably engaged in by the block 40. This block is pivotally connected to the crank arm 41 upon the shaft 42, the axis of which is offset from the axis of the gear 37 and preferably in vertical alignment therewith. The worm gear 43 is non-rotatably mounted upon the shaft 42 and is driven by the worm pinion 44 non-rotatably secured to the vertical shaft 45, the lower end of which has non-rotatably mounted thereon the worm gear 46 engaged by the worm pinion 47. This pinion is non-rotatably mounted upon the horizontal shaft 48 to which is splined the wheel 49, slidable longitudinally thereof and adapted to engage the disc 50 at various points of its diameter. This disc is yieldably held in engagement with the wheel 49 by means of the coil spring 50' and is suitably driven from the motor 38, as by the belt 51. For rotating the pulley 26, which drives the cutter 7, the belt 52 is provided extending around the pulley 26 and around the pulley 53 non-rotatably secured to the outer end of the shaft 48.

With the construction as thus far described, it will be readily seen that upon rotation of the main bearing 8, the eccentric sleeves 9 and 12 and the spindle bearing 15 will be rotated therewith. The spindle 23 with the cutter 7 being carried in the spindle bearing 15, which is eccentrically mounted with respect to the main bearing 8, the cutter will be moved through a circular orbit. The spindle 23 is revolved within the spindle bearing 15, thereby revolving the cutter 7 so that the cutter will be revolved as well as moved through a circular orbit.

54 is indexing mechanism for automatically rotating the gear 6 in timed relation with the return travel of the cutter through its orbit to advance the next tooth into operative relation with the cutter. As specifically shown, this indexing mechanism comprises the yoke 55 horizontally slidably mounted in the bearings 55' upon the standard 2. This yoke has the recess 56, the width of which is substantially equal to the outer diameter of the enlarged head 16 of the spindle bearing 15 and the height of which is sufficiently greater so that upon revolving the spindle bearing 15, the yoke will be moved horizontally only. This yoke is located between the member 22 and the nose-piece 57 held upon the spindle 23 by the flared end of the latter. One end of the yoke is fixedly secured to the arm 58, the outer end of which pivotally carries the arm 59, the free end of which is adapted to engage the teeth 6' of the gear. Suitable means, such as the coil spring 60 is provided for yieldably holding the free end of the arm 59 against the teeth of the gear.

For the purpose of retaining the gear 6 stationary during the time the revolving cutter is rounding the end of one of the teeth, the following mechanism is provided: 60' is an arm slidably mounted in the standard 2 in vertical alignment with the axis of the main bearing 8. The outer end of this arm 60' is provided with suitable teeth 61 for engaging the teeth 6' of the gear. The inner end of this arm 60' is provided with the pin 62 which slidably engages the elongated aperture 63 in the vertically-extending arm 64. A pin 65 upon the standard 2 also engages the lower end of the elongated aperture 63. The upper end of the arm 64 is pivotally secured to the horizontally extending bar 66 slidably mounted in the standard 2. This bar is provided with the projection 67 for engaging the cam-shaped groove 68 in the outer surface of the main bearing 8, this groove being so shaped that during the cutting operation the arm 60 retains the gear stationary and during the return portion of the travel of the cutter through its orbit, the arm 60 is withdrawn from engagement with the teeth of the gear to permit of the operation of the indexing mechanism 54.

Assuming the cutter 7 to be intermediate the gear teeth 6' of the work preparatory to cutting the end of a tooth, and the work held stationary by the arm 60' so that the center of the tooth to be cut is in alignment with the axis of the main bearing 8. Upon starting of the motor 38 the main bearing 8 will be revolved to move the cutter 7 through a circular orbit and the cutter will also be revolved. The cutter moves over the end of the tooth being cut during the cutting portion of its orbit, or the first half of its orbit, so that after the cutting operation is effected the cutter is on the side of the tooth opposite that at the time of starting the cutting operation. After the completion of this step and upon continued revolving of the main bearing 8 the teeth 61 upon the arm 60' are disengaged from the gear teeth by means of the cam-shaped groove 68 in the main bearing longitudinally moving the bar 66 through its projection 67, which bar swings the vertically-extending arm 64 in turn connected to the arm 60'. After the disengagement of the holding arm 60' with the gear teeth 6' the gear is rotated a distance of one tooth by means of the free end of the arm 59 engaging the gear, this arm being moved partially across the gear in its plane of rotation by the yoke 55, which is moved by the nose-piece 57 which is with the cutter 7 mounted eccentrically of the main bearing 8. The arrangement is such that while the cutter 7 is being returned to its original position during the second half of its circular orbit the next gear tooth is being advanced and the cutter maintains its same relative position between the teeth as it occupied at the end of the first half of its orbit. When the gear has been advanced it is again engaged by the arm 60' and the parts are in position for another cutting operation. The driving mechanism is so arranged that during the time the cutter is operating upon the end of a tooth, the main bearing 8 is revolved more slowly than during the remainder of the cycle. Specifically, the block 40 in the radial slot 39 of the gear 37 is located farther from the axis of the gear during the cutting operation than during the return movement of the cutter, whereby the desired timing is secured.

Thus, it will be readily seen that the means for rotating the cutter through its circular orbit also operates the indexing mechanism after the cutting operation, and furthermore operates the mechanism for retaining the gear from revolving during the cutting operation. Since the indexing mechanism is directly controlled by means of the mechanism for moving the cutter through its orbit, the relative horizontal position of the free end of the gear teeth engaging member with respect to the cutter is the same at all times so that the gear will be rotated at the same rate of speed as the rate of speed of the cutter in a horizontal plane during its return movement. Due to the arrangement for driving the main bearing and for also revolving the cutter from a common driving mechanism, the construction is greatly simplified. Furthermore, the time consumed in moving the revolving cutter through the cutting portion of its orbit is considerably greater than the time consumed in returning the cutter to its starting point.

What I claim as my invention is:

1. In a machine for rounding the ends of gear teeth, the combination with a revolving cutter adapted to engage the ends of the teeth, of means for moving said cutter through an arc from one side of a tooth to its other side and for returning said cutter to its starting point, and means for advancing the next tooth to be in operative relation with respect to said cutter when the latter is at its starting point, said advancing means maintaining the relative positions of said cutter and other side of the tooth.

2. In a machine for rounding the ends of gear teeth, the combination with a revolving cutter adapted to engage the ends of the teeth, of a common means for moving said cutter through a continuous orbit, and for indexing the gear to advance the next tooth into operative relation with said cutter.

3. In a machine for rounding the ends of gear teeth, the combination with a revolving cutter adapted to engage the ends of the teeth, of means for carrying and moving said cutter through an arc from one side of a tooth to its other side, and indexing means operated by said cutter carrying and moving means for advancing the next tooth into operative relation with said cutter.

4. In a machine for rounding the ends of gear teeth, the combination with a revolving cutter adapted to engage the ends of the teeth, of means for moving said cutter through a continuous orbit, said cutter moving from one side of a tooth to its other side during a portion of the travel through its orbit, and means for rotating the gear in timed relation with said cutter during the remaining portion of travel of said cutter.

5. In a machine for rounding the ends of gear teeth, the combination with a revolving cutter adapted to engage the ends of the teeth, of means for moving said cutter through a continuous orbit, said cutter moving from one side of a tooth to its other side during a portion of the travel through its orbit, and indexing mechanism operated by said cutter moving means for rotating the gear in timed relation with said cutter during the remaining portion of the travel of said cutter through its orbit.

6. In a machine for rounding the ends of gear teeth, the combination with a revolving cutter adapted to engage the ends of the teeth, of a common means for moving said cutter through a continuous orbit, said cutter moving from one side of a tooth to its other side during a portion of its travel through its orbit, for holding the gear stationary during said portion of travel of said cutter, and for rotating the gear in timed relation with said cutter during the remaining portion of travel of said cutter to advance the next tooth into operative relation to said cutter.

7. In a machine for rounding the ends of gear teeth, the combination with a revolving cutter adapted to engage the ends of the teeth, of means for moving said cutter through a continuous orbit, said cutter moving from one side of a tooth to its other side during a portion of the travel through its orbit, means for retaining the gear stationary during said portion of travel of said cutter, and means for rotating the gear in timed relation with said cutter during the remaining portion of the travel of said cutter.

8. In a machine for rounding the ends of gear teeth, the combination with a revolving cutter adapted to engage the ends of the teeth, of means for carrying and moving said cutter through an arc from one side of a tooth to its other side, means for subsequently automatically advancing the next tooth into operative relation with respect to said cutter, and automatically operating means actuated by said cutter carrying and moving means for retaining the gear stationary during the time the cutter is moving through said arc from one side of a tooth to its other side and for releasing the gear to permit of advancing the next tooth.

9. In a machine for rounding the ends of gear teeth, the combination with a cutter adapted to engage the ends of the tooth, of means for moving said cutter through a circular path, said cutter moving around the end of a tooth from one side to the other side thereof during a portion of its travel and remaining on said other side during the remaining portion of its travel, and means for automatically advancing said tooth in timed relation with said cutter during the last-mentioned portion of travel of said cutter.

10. In a machine for rounding the ends of gear teeth, the combination with a revolving cutter adapted to engage the ends of the teeth, of separately revolving means carrying said cutter and adapted to move said cutter through a circular path of travel, said cutter moving through an arc from one side of a tooth to its other side during the advancing portion of its travel and remaining on said other side of the tooth during its return portion of travel, indexing mechanism operated by said cutter carrying means for moving said gear in timed relation with said cutter during its return portion of travel, and means operated by said cutter carrying means for retaining said gear stationary during the advancing portion of the travel of said cutter.

11. In a machine for rounding the ends of gear teeth, the combination with a revolving sleeve, of a revolving cutter adapted to engage the ends of the teeth, eccentric sleeves in said rotatable member and carrying said cutter, said sleeves being rotatable to vary the position of said cutter relative to the axis of said revolving sleeve, and means for guiding said cutter to compel the same to move in a straight line when its position is varied.

12. In a machine for rounding the ends of gear teeth, the combination with a revolving sleeve, of outer and inner eccentric sleeves in said revolving sleeve and revolving therewith, a member revolving with said revolving sleeve and provided with an elongated aperture, a cutter adapted to engage the ends of the teeth of the gear, and a cutter spindle carrying said cutter and revolving in said inner eccentric sleeve, said spindle slidably engaging in said elongated aperture.

13. In a machine for rounding the ends of gear teeth, the combination with a member revolving in one direction only, of an independently revolving cutter eccentrically mounted on said member and adapted to engage the ends of the teeth, and means for slowly revolving said member during a part of a rotation and more rapidly revolving said member for the remaining part of the rotation.

14. In a machine for rounding the ends of gear teeth, the combination with a member revolving in one direction only, of an independently revolving cutter eccentrically mounted on said member and adapted to engage the ends of the teeth, gears connected to said member to comparatively slowly revolve the same during a part of a rotation thereof and to rapidly revolve said member during the remaining part of the rotation.

15. In a machine for rounding the ends of gear teeth, the combination with a revolving cutter adapted to engage the ends of the teeth, of means for moving said cutter through a continuous orbit in one direction only, and means for advancing the next tooth of the gear into operative relation with said cutter, said advancing means operating during a portion of the travel of said cutter.

In testimony whereof I affix my signature.

VICTOR COLLIAU.